United States Patent [19]

Vitt et al.

[11] Patent Number: 5,165,069
[45] Date of Patent: Nov. 17, 1992

[54] METHOD AND SYSTEM FOR NON-INVASIVELY IDENTIFYING THE OPERATIONAL STATUS OF A VCR

[75] Inventors: James J. Vitt, Dunedin; Allen L. Fulmer, Clearwater, both of Fla.; Daozheng Lu, Buffalo Grove, Ill.

[73] Assignee: A. C. Nielsen Company, Northbrook, Ill.

[21] Appl. No.: 559,825

[22] Filed: Jul. 30, 1990

[51] Int. Cl.⁵ .............................................. H04N 5/76
[52] U.S. Cl. .................................. 358/335; 360/33.1; 395/22
[58] Field of Search ............... 358/335, 310, 330, 340, 358/336; 360/27, 29, 33.1; 395/22

[56] References Cited

U.S. PATENT DOCUMENTS

| | | | |
|---|---|---|---|
| 4,574,304 | 3/1986 | Watanabe et al. | 358/84 |
| 4,591,938 | 5/1986 | Jacobs | 360/137 |
| 4,633,302 | 12/1986 | Damoci | 358/84 |
| 4,697,209 | 9/1987 | Kiewit et al. | 358/84 |
| 4,876,731 | 10/1989 | Loris et al. | 382/40 |
| 4,991,027 | 2/1991 | Enoki | 358/330 |
| 5,113,265 | 5/1992 | Kobayashi et al. | 358/330 |

OTHER PUBLICATIONS

Brochure of Neural Ware, Incorporated, copyright (©) 1987 "Neural Ware Inc.".
R. Colin Johnson, "The Evolution of a Neural Network . . . Pondering the Perceptron" Electronic Engineering Times, pp. 33-34.

Primary Examiner—Tommy P. Chin
Assistant Examiner—Robert Chevalier
Attorney, Agent, or Firm—Marshall, O'Toole, Gerstein, Murray & Bicknell

[57] ABSTRACT

A method and apparatus are provided for identifying one of a plurality of operational modes of a monitored video cassette recorder (VCR). A sensor is positioned near the monitored VCR for detecting a radiated signal of the monitored VCR. The detected signal is appplied to a filter for filtering the detected signal and for providing a plurality of predetermined band-pass filtered signals. A neural network is used for processing the plurality of predetermined band-pass filtered signals to identify the operational mode of the VCR.

17 Claims, 1 Drawing Sheet

METHOD AND SYSTEM FOR NON-INVASIVELY IDENTIFYING THE OPERATIONAL STATUS OF A VCR

BACKGROUND OF THE INVENTION

1. Field of the Invention

The present invention relates to methods and apparatus for monitoring video receivers and identifying the viewing habits of the public, and more particularly to a method and apparatus for identifying the operational status of a video casette recorder.

2. Description of the Prior Art

Various arrangements have been employed to determine both the channel to which a television receiver is tuned and the operational status of a video recorder. A disadvantage of many known monitoring arrangements is that an internal connection to the video casette recorder (VCR) is required.

For example, U.S. Pat. No. 4,697,209, issued Sep. 29, 1987 to David A. Kiewit and Daozheng Lu discloses a method and apparatus for automatically identifying programs viewed or recorded. The disclosed method and apparatus provides an improved way to identify programs and to monitor the viewing habits of the public. However, identification of the video casette recorder's operational modes requires access to characteristic points in a VCR's circuitry for detecting changes in voltage values.

Providing internal connections to the VCR's circuitry is time consuming and complicated due to the wide range of different VCR's currently being used.

SUMMARY OF THE INVENTION

A principal object of the present invention is to provide an improved method and apparatus for identifying one of a plurality of operational modes of a monitored video casette receiver.

It is another object of the present invention to provide a method and apparatus for identifying one of a plurality of operational modes of a monitored video casette receiver that overcomes many of the disadvantages of the prior art systems.

It is another object of the present invention to provide a method and apparatus that utilizes a neural network for identifying one of a plurality of operational modes of a monitored video casette receiver.

In brief, the objects and advantages of the present invention are achieved by a method and apparatus for identifying one of a plurality of operational modes of a monitored video casette recorder (VCR). A sensor is positioned near the monitored VCR for detecting a radiated signal of the monitored VCR. The detected signal is applied to a filter for filtering the detected signal and for providing a plurality of predetermined band-pass filtered signals. A neural network is used for processing the plurality of predetermined band-pass filtered signals to identify the operational mode of the VCR.

BRIEF DESCRIPTION OF THE DRAWING

These and other objects and advantages of the present invention may best be understood from the following detailed description and attached drawing, wherein.

DETAILED DESCRIPTION OF THE PREFERRED EMBODIMENT

Figure 1:
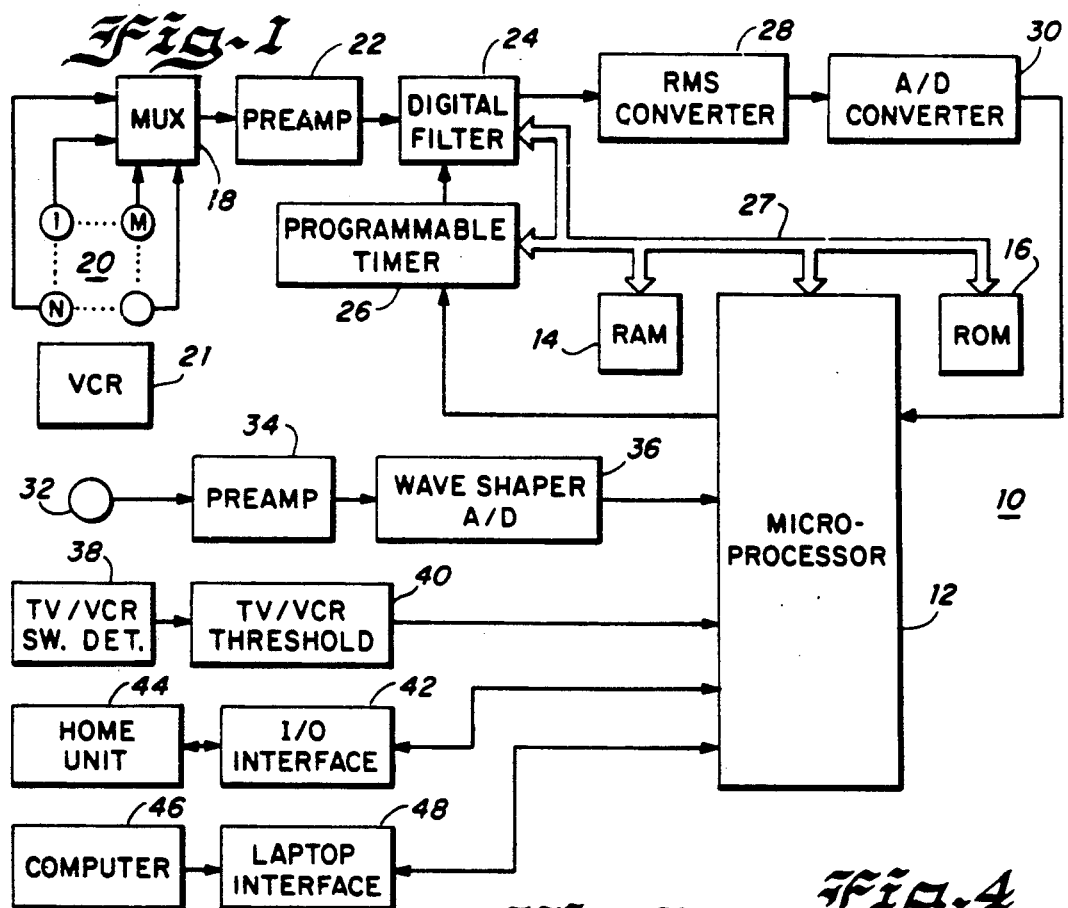
FIG. 1 is an electrical schematic representation of the apparatus for identifying channel reception and for measuring the operational status of a video recorder in accordance with the present invention.

Referring now to the drawing, in FIG. 1 there is illustrated a new and improved monitoring apparatus for identifying the operational status of a video casette recorder (VCR) generally designated by the reference numeral 10. While the monitoring apparatus 10 is depicted and generally described herein for monitoring a video recorder, it should be understood that the principles of the present invention are also applicable to other audience recognition and monitoring systems.

The monitoring apparatus 10 includes a processor device such as a microprocessor 12 and associated memory devices, such as a random access memory RAM 14 and a read only memory ROM 16 for data and program storage.

In accordance with a feature of the invention, a neural network simulation program is utilized for performing VCR mode identification by the microprocessor 12. Neural network simulation software, such as a Network II, Professional II manufactured and sold by NeuralWare, Inc. of Pittsburgh, Pa. advantageously can be used for defining the neural network simulation for the VCR mode identification. Then the thus defined neural network simulation can be converted to a C-coded program using a DPACK program also manufactured and sold by NeuralWare, Inc. Then the C-coded neural network can be compiled for processing using the microprocessor 12.

Figure 2:
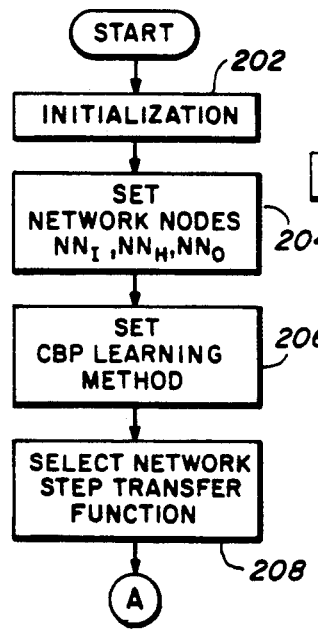
FIGS. 2-4 are flow oh arts illustrating the logical steps performed by the apparatus of FIG. 1.

Initialization procedures for the neural network are illustrated and described with respect to FIG. 2. A learning routine or training of the neural network is illustrated and described with respect to FIG. 3. Execution in real time after the neural network has been trained is illustrated and described with respect to FIG. 4.

A multiplexer 18 is coupled to a first sensor array generally designated by the reference numeral 20 of the monitoring apparatus 10 positioned proximate to a particular monitored VCR 21 monitors a radiation spectrum of the VCR 21. A detected signal of the sensor 20 is applied to a preamplifier device 22 which provides an amplified detected signal. The amplified detected signal is applied to a scanning digital filter 24 used in conjunction with a programmable timer 26. A microprocessor bus 27 for data, address, and control signals enables communications between the microprocessor 12 and the scanning digital filter 24 and the programmable timer 26. The scanning digital filter 24 and the programmable timer 26 are operatively controlled by the microprocessor 12. The filtered signal of the scanning digital filter 24 is applied to a root mean square (RMS) converter 28 which generates an RMS signal. Then the RMS signal is digitized by an analog to digital (A/D) converter 30. The digitized signal of the A/D converter 30 is applied to the microprocessor 12.

The programmable timer 26 sequentially applies a stepwise variable center frequency signal to the scanning digital filter 24 for selected band-pass monitored frequencies within a predetermined overall frequency range, for example, such as 50 Hz to 80 KHz. A plurality of predetermined band-pass filtered signals provided by the filter 24 includes significant frequencies of 63 Hz, 200 Hz, 315 Hz, 1 KHz, 2 KHz, 4 KHz, 16 KHz and 70 Khz. Each monitored spectral frequency has a predefined input node of the neural network simulation program performed by the microprocessor 12. The first sensor 20 may consist of either a single transducer or an array M×N, as shown. When a single transducer 20 is used, it is placed in an optimal position proximal to the VCR 21 so as to optimize its signal that can be directly applied to the preampifier device 22. When an array of M×N transducers 20 (where M is typically 4 and N is typically 6) is used, the output of each of the M×N transducers 20 is multiplexed by the multiplexer 18 and applied to the preampifier device 22, then the microprocessor 12 can select those transducers 20 of the M×N array that yield the highest signal, thus avoiding the necessity of moving the transducer 20 about the VCR 21 seeking for an optimal location. Each sensor 20 of the M×N sensor array may include an inductive transducer or a capacitive transducer adapted for detecting the radiated output spectrum of a capstan motor of the VCR 21. Alternatively, a combination of inductive and capacitive transducers 20 can be used for the sensors 20.

Various commercially available microprocessor devices can be utilized for the microprocessor 12, such as, for example a Motorola, Inc. microprocessor device 68HC11. A programmable digital filter, such as, for example, a MAX260 series digital filter device manufactured and sold by Maxim Integrated Products, Inc. of Sunnyvale, Calif., can be used for the scanning digital filter 24. The programmable timer 26 can be implemented with a 74HC274 device type manufactured and sold by various suppliers, such as Motorola, Inc. An Analog Devices device type AD536A can be used for the RMS converter 28. A/D converter capability of the 68HC11 microprocessor 12 can be used for the A/D converter 30.

A sensor 32 detects a radiated erase head signal of the VCR 21. A tuned circuit probe for detecting a 70 KHz radiated erase head signal can be used for the sensor 32. The detected signal is amplified by a preamplifier 34 and applied to a wave shaper A/D converter circuit 36 which generates a digitized signal. The digitized signal is applied to the microprocessor 12 for identifying either a record operational mode of the VCR 21 or the VCR 21 is not in t he record operational mode. The record mode of the VCR 21 is identified directly responsive to the received digitized signal by the microprocessor 12 without being processed by the neural network.

A probe or TV/VCR switch detector 38 of the monitoring apparatus 10 provides a signal to TV/VCR threshold circuit 40. The TV/VCR threshold circuit 40 is used in conjunction with the TV/VCR switch detector 38 to provide a signal to the microprocessor 12 representative of the TV or VCR operational functions of the TV/VCR switch of the VCR 21.

The monitoring apparatus 10 further includes an input/output (I/0) interface circuit 42 that enables bidirectional data transfer between the monitoring apparatus 10 and a host system or home unit 44. A home unit 44 that can be employed is described in U.S. Pat. No. 4,697,209, issued Sep. 29, 1987 to David A. Kiewit and Daozheng Lu. The disclosure of the above-mentioned patent is incorporated herein by reference. A computer interface logic circuit 48 provides bidirectional communications with a computer 46 to enable testing of the monitoring apparatus 10.

Referring now to FIG. 2, there is shown a flow chart illustrating initialization procedures for the neural network. The sequential operations begin with first initialization steps performed as indicated at a block 202. Next, neural network parameters are defined by setting the number of neural network input nodes $NN_I$, neural network hidden nodes $NN_H$ and neural network output nodes $NN_O$ as indicated at a block 204. For example, the number of neural network input nodes $NN_I$ can be set for eight inputs, with two neural network hidden nodes $NN_H$ and seven neural network output nodes $NN_O$. For example, each selected spectral frequency such as 63 Hz, 200 Hz, 315 Hz, 1 KHz, 2 KHz, 4 KHz, 16 KHz and 70 Khz monitored by the sensor 20 is applied to a predetermined one of the neural network input nodes $NN_I$.

Then a cumulative back propagation (CBP) learning method is set for the neural network as indicated at a block 206. Next a step transfer function is selected for the neural network as indicated at a block 208. The sequential operations continue following an entry point A in FIG. 3.

Figure 3:
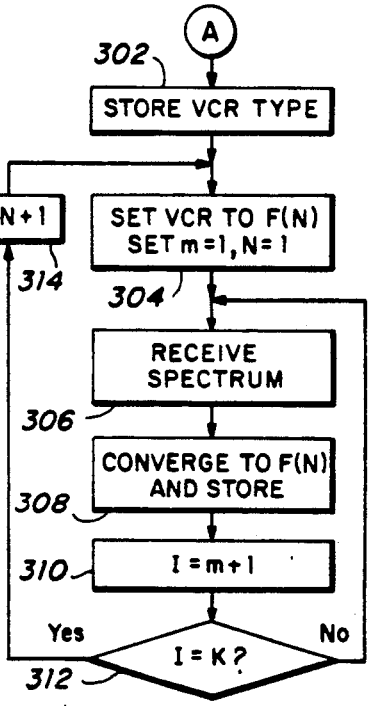

Referring to FIG. 3, there is shown a flow chart illustrating a learning routine or training of the neural network. First, a particular device type corresponding to the particular VCR model for the VCR 21 is stored as indicated at a block 302. Next a first defined operational mode F(N) of the VCR 21 is set as indicated at a block 304. For example, a manually selected play function of the VCR is selected and mapping of the input signals to a defined output is then performed. As indicated at a block 306, the spectrum signals are received. The neural network utilizing the step function converges to the selected functional output, such as play, and stores the spectral profile by the neural network as indicated at a block 308. A next iteration of the training process is then performed by incrementing m with I set equal to m+1 as indicated at a block 310. Next the resulting value of I is compared with a stored value K, such as equal to 1000, where K defines a selected number of iterations to be performed as indicated at a block 312. If I is less than or equal to K, then a next iteration is performed with the sequential operations returning to the block 306. Otherwise when I is greater than K, then a next function F(N+1) for the VCR is selected as indicated at a block 314, such as fast forward, then the sequential neural network training steps are repeated.

Figure 4:
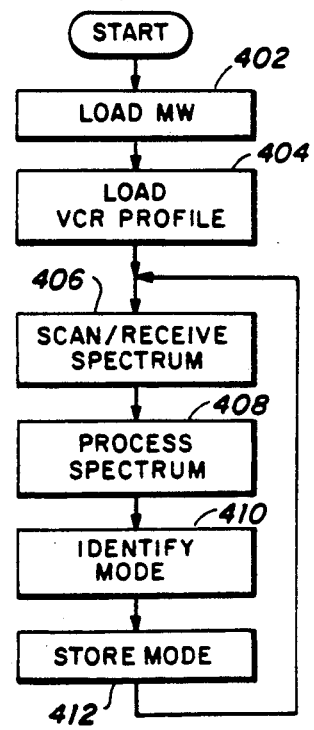

FIG. 4 provides a flow chart illustrating the real time execution or monitoring by the neural network after training has been performed for the VCR 21. First the neural network MW is loaded by the microprocessor 12 as indicated at a block 402. Next the learned VCR profile for the particular type of VCR is loaded as indicated at a block 404. Then scanning and receiving the spectral signals is performed as indicated at a block 406. Processing of the received spectral signals is continuously performed as indicated at a block 408 and the output identification of the operational mode is made as indicated at a block 410. Then the identified operational mode of the VCR is stored as indicated at a block 412. The sequential monitoring steps are repeated so that the input vector of the monitored spectral frequencies is continuously updated and the output is refreshed after each scan.

While the invention has been described with reference to details of the illustrated embodiment, these details are not intended to limit the scope of the invention as defined in the appended claims.

What is claimed is:

1. Apparatus for identifying one of a plurality of operational modes of a monitored video casette recorder (VCR) comprising:
   sensor means for detecting a signal being radiated by said monitored VCR, said signal being indicative of one of said plurality of operational modes of said monitored VCR;
   filter means coupled to said sensor means for filtering said detected signal and for providing a plurality of predetermined band-pass filtered signals, said plurality of predetermined band-pass filtered signals provided by said filter means being within a range between 50 Hz and 80 KHz; and
   neural network means coupled to said filter means for processing said plurality of predetermined band-pass filtered signals to identify the operational mode of the VCR.

2. Apparatus as recited in claim 1 wherein said sensor means comprises an inductive transducer.

3. Apparatus as recited in claim 1 wherein said sensor means comprises an array of inductive transducers.

4. Apparatus as recited in claim 1 wherein said sensor means comprises a capacitive transducer.

5. Apparatus as recited in claim 1 wherein said sensor means comprises an array of capacitive transducers.

6. Apparatus as recited in claim 1 wherein said sensor means comprises an array including at least one capacitive transducer and at least one inductive transducer.

7. Apparatus as recited in claim 1 wherein said filter means comprises a scanning digital filter.

8. Apparatus as recited in claim 1 wherein said plurality of predetermined band-pass filtered signals provided by said filter means include at least one frequency of about 63 Hz, 200 Hz, 315 Hz, 1 KHz, 2 KHz, 4 KHz, 16 KHz, 70 Khz.

9. Apparatus for identifying one of a plurality of operational modes of a monitored video casette recorder (VCR) comprising:
   sensor means for detecting a signal being radiated by said monitored VCR, said signal being indicative of one of said plurality of operational modes of said monitored VCR;
   filter means coupled to said sensor means for filtering said detected signal and for providing a plurality of predetermined band-pass filtered signals; and
   neural network means coupled to said filter means for processing said plurality of predetermined band-pass filtered signals to identify the operational mode of the VCR, said neural network means including an input node for each of said plurality of predetermined band-pass filtered signals.

10. Apparatus as recited in claim 9 wherein said neural network means is a cumulative back propagation network.

11. Apparatus as recited in claim 9 wherein said neural network means has two hidden layer nodes.

12. Apparatus as recited in claim 9 wherein said neural network means includes a step transfer function.

13. Apparatus as recited in claim 9 wherein said neural network means includes eight input nodes and seven output nodes.

14. Apparatus as recited in claim 13 wherein said neural network means includes two hidden nodes.

15. Apparatus as recited in claim 13 wherein said neural network means includes a learned VCR profile for the monitored VCR.

16. Apparatus for identifying the operational mode of a plurality of operational modes of a monitored video casette recorder (VCR) comprising:
    sensor means for detecting a radiated signal of said monitored VCR;
    filter means coupled to said sensor means for filtering said detected signal and for providing a plurality of predetermined band-pass filtered signals;
    converter means coupled to said filter means for converting each said plurality of predetermined band-pass filtered signals to a root mean square (RMS) signal; and
    neural network means coupled to said converter means for sequentially scanning each said RMS signal to identify the operational mode of the VCR.

17. A method for identifying one of a plurality of operational modes of a monitored video casette recorder (VCR) comprising the steps of:
    detecting a signal being radiated by said monitored VCR for each of the plurality of operational modes;
    filtering said detected signal and providing a plurality of predetermined band-pass filtered signals to a neural network for each of the plurality of operational modes;
    storing a defined output with said plurality of predetermined band-pass filtered signals for each of the plurality of operational modes to define a VCR profile;
    detecting an undefined signal being radiated by said monitored VCR;
    filtering said undefined detected signal and providing said plurality of predetermined band-pass filtered signals to a neural network; and
    processing said plurality of predetermined band-pass filtered signals with said neural network to identify the operational mode of the VCR utilizing said stored VCR profile.

* * * * *